(12) United States Patent
Li (10) Patent No.: US 6,700,723 B2
(45) Date of Patent: Mar. 2, 2004

(54) ULTRAHIGH DENSITY LONGITUDINAL RECORDING ON MAGNETIC MEDIA

(75) Inventor: Zhihao Li, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 403 days.

(21) Appl. No.: 09/822,566

(22) Filed: Mar. 30, 2001

(65) Prior Publication Data

US 2001/0030895 A1 Oct. 18, 2001

Related U.S. Application Data

(60) Provisional application No. 60/193,691, filed on Mar. 31, 2000.

(51) Int. Cl.$^7$ ................................................ G11B 5/09
(52) U.S. Cl. .......................................... 360/53; 360/39
(58) Field of Search .............................. 360/51, 75, 39, 360/43, 25, 31, 53; 369/47.3

(56) References Cited

U.S. PATENT DOCUMENTS

| | | | |
|---|---|---|---|
| 4,881,136 A | | 11/1989 | Shiraishi et al. |
| 6,025,970 A | * | 2/2000 | Cheung .................. 360/77.08 |
| 6,101,227 A | | 8/2000 | Glover |
| 6,198,587 B1 | * | 3/2001 | Hayashi ...................... 360/65 |
| 6,278,568 B1 | * | 8/2001 | Cloke et al. .................. 360/51 |
| 6,411,458 B1 | * | 6/2002 | Billings et al. ................ 360/75 |
| 6,459,539 B1 | * | 10/2002 | Carlson et al. ............... 360/31 |
| 6,542,342 B1 | * | 4/2003 | Hayashi et al. .......... 360/324.2 |

* cited by examiner

Primary Examiner—David Hudspeth
Assistant Examiner—Glenda Rodriguez
(74) Attorney, Agent, or Firm—David K. Lucente; Derek J. Berger (57) ABSTRACT

Monitoring the decay of the magnetic domains and refreshing the magnetic domains when the amount of decay has passed an established threshold allows a means to compensate for the superparamagnetic effect and increase the amount of data stored on a recording media. A high frequency reference signal and a low frequency reference signal can be written onto the magnetic media. The low frequency reference signal corresponds to large magnetic bits on the storage media surface, whereas the high frequency reference signal corresponds to small magnetic bits. Because of the large difference in decay rates between the high frequency and low frequency reference signals, any change in the difference of the two signals over time actually reflects the level of signal degradation that has occurred in the high frequency reference signal. When the difference between the high frequency and low frequency reference signal degradations exceeds a threshold level, the data is refreshed and new high and low frequency reference signals can be written on the magnetic media.

14 Claims, 8 Drawing Sheets

ULTRAHIGH DENSITY LONGITUDINAL RECORDING ON MAGNETIC MEDIA

RELATED APPLICATIONS

This application claims priority of U.S. provisional application Serial No. 60/193,691, filed Mar. 31, 2000.

FIELD OF THE INVENTION

This application relates generally to the field of information storage and more particularly to a method for increasing the reliability of data storage at high areal densities.

BACKGROUND OF THE INVENTION

The need for more efficient data storage devices has become critical with the staggering pace of advances in computer technology. The most common data storage device used today is the disc drive. Most disc drives are composed of one or more magnetic media discs attached to a spindle. A spindle motor rotates the spindle and discs at a constant high speed. An actuator assembly adjacent to the disc(s) has actuator arms extending over the discs, each with one or more flexures extending from each actuator arm. A read/write head is mounted at the distal end of each of the flexures. The read/write head includes an air bearing slider enabling the head to fly in close proximity above the corresponding surface of the associated disc. Information is stored on and retrieved from the magnetic media discs via the read/write head.

Currently, the disc drive industry utilizes longitudinal recording technology. With longitudinal recording, a bit of information is stored by orienting the magnetization direction of each domain on the disc surface lengthwise in the direction of rotation of the disc. A bit may be made up or one or more domains. A domain may consist of one or more magnetic grains, where a grain may consist of one or more atoms. Each disc is divided radially into a finite number of concentric tracks to organize the stored bits. Each track is a certain width and is separated from the adjacent tracks by a "blank space". This blank space prevents information stored in one track from overlapping the information stored in an adjacent track. The number of tracks located on each disc surface is known as the track density. Each track is subdivided into sections, called segments. Bits are written to and read from these segments by the read/write head. The linear density of bits stored within each segment is called the bit density.

The product of track density and bit density is known as areal density. The recent trend being followed by disc drive manufacturers is to increase the recording media's areal density so that the amount of data stored can be increased without increasing the physical size or the number of discs used in a drive. For example, the areal density of early disc drives was less that 1 Gbits/sq. inch, whereas today, disc drives with areal densities greater than 40 Gbits/sq. inch are being tested. Manufacturers increase areal density by increasing both track density and bit density. Narrowing track width and/or narrowing the width of the blank spaces between tracks increase track density. Bit density is usually increased by increasing the recording speed in order to record higher frequency bits; a higher frequency bit takes up less space on the disc surface.

Packing more information onto a given size magnetic media has certain drawbacks. As mentioned above, the individual magnetic bits located on the recording media become smaller as areal density increases. Furthermore as the frequency of a magnetic bit stored in a magnetic domain increases, the magnetic bit size decreases. However as the frequency of the bit rises, the tendency of the bit orientation to decay, or disorient, increases exponentially, thereby increasing the risk of data loss. (For example, a bit with the frequency of 50.8 MHz may decay over a period of 1000 years; whereas, a bit with only twice that frequency, 101.6 MHz, may decay over a period of 10 years.) At a certain point, magnetic bits become so small that they are unstable at room temperature and spontaneously decay, thereby making data storage impossible. This phenomenon is known as the superparamagnetic effect. Because of the superparamagnetic effect, the amount of data that can physically be stored on a disc surface is limited. It has been predicted that about 100 Gbits/sq. inch is the highest density of data that can be achieved on a magnetic disc using the longitudinal recording method. Furthermore, with the current rate of technological advances, it is predicted that the superparamagnetic limit will be reached within the next two years.

Disc drive manufacturers are investigating non-longitudinal recording techniques such as vertical recording, holographic recording, and special signaling or orientating of the storage media among others in an attempt to overcome the 100 Gbits/sq. inch limit caused by the superparamagnetic effect. However, longitudinal recording offers cost, manufacturing, and technological advantages that the disc drive manufacturers wish to exploit.

Accordingly, there is a need for means or method of exploiting the benefits of longitudinal recording while avoiding or compensating for the superparamagnetic limit.

SUMMARY OF THE INVENTION

Against this backdrop the present invention has been developed to increase the amount of data that can reliably be stored on magnetic media. The present invention offers a means to compensate for the superparamagnetic effect and increase the amount of data that can be reliably stored on a recording media by monitoring the decay of the magnetic bits and refreshing the magnetic bits when the amount of decay has passed a pre-established threshold. The present invention can be used for any type of magnetic media storage system such as disc drive and magnetic tape drives among others. However, a disc drive has been used for illustrating the invention.

According to the present invention, a high frequency reference signal and a low frequency reference signal may be either written onto the magnetic media during the disc drive manufacturing process or during normal operation of the drive. The low frequency reference signal corresponds to larger magnetic bits on the storage media surface, whereas the high frequency reference signal corresponds to smaller magnetic bits on the media surface. In the case of a disc drive, these signals can be written to a dedicated system track (called a "super track") or to a dedicated system track sector (called a "super sector"). The reference signals can contain important parametric information such as amplitude, bit error rate, signal to noise ratio, and spectrum information (FFT of the signal).

The low frequency reference signal, because it decays at an exponentially slower rate than the high frequency reference signal, can be used as a baseline to determine the amount of decay in the high frequency signal. Any change in the difference between the two signals' parametric information actually reflects the level of signal degradation that has occurred in the high frequency reference signal. In other words, the low frequency reference signal's parametric information remains constant (for all practical purposes) when compared to the high frequency reference signal's parametric information. Therefore, if the difference between the two signals' parametric information increases, the increase can be attributed to the high frequency reference signal's decay. Furthermore because the high frequency reference signal corresponds to the higher density and smaller magnetic bit size on the media, any degradation of the high frequency reference signal can be used as an indication of decay in the media's data domains.

When the present invention is applied to a disc drive, the disc drive's read/write head is used to read the high and low frequency reference signals; an average of many read operations is preferably used to determine the difference ("$\Delta$") of the parametric information between the high frequency reference signal and the low frequency reference signal. The difference determined after first writing the signals on the magnetic media ("$\Delta_{original}$") can be recorded on the disk media and/or in system memory as a reference baseline.

Each time the disc drive is subsequently activated, after the signals have first been written on the magnetic media, it can perform a self-diagnostic test. The same real time parametric information, as measured to determine $\Delta_{original}$, is measured and recorded. This real time difference measurement ("$\Delta_n$") is then compared with $\Delta_{original}$. The difference between $\Delta_n$ and $\Delta_{original}$ (called "$\delta$") is compared to a predefined threshold limit. If $\delta$ exceeds the threshold limit, the user can be warned that a backup and/or refresh procedures should be completed. Storage devices such as CD-ROM's, storage attached network ("SAN"), network attached storage ("NAS"), among others, can be utilized for this back up. Alternatively, the data on the disc can be automatically backed up and/or refreshed without user input. The high frequency and low frequency reference signals can also be refreshed in order to establish a new baseline for the subsequent delta calculation (i.e., a new $\Delta_{original}$).

In accordance with other aspects, the present invention relates to an apparatus for increasing the amount of data reliably stored on magnetic media. The apparatus includes a controller for writing a high frequency and a low frequency reference signal onto the magnetic media, reading the signals from the magnetic media, determining the difference between the signals, and comparing the difference to a threshold. If the difference exceeds the threshold, the controller notifies the user that the data stored on the magnetic media needs to be refreshed or backed up. Storage devices such as CD-ROM's, storage attached network ("SAN"), network attached storage ("NAS"), among others, can also be utilized for this back up. Alternatively, the apparatus can automatically refresh and/or back up the data stored on the magnetic media without user input.

These and various other features as well as additional advantages which characterize the present invention will be apparent from a reading of the following detailed description and a review of the associated drawings.

DETAILED DESCRIPTION

Figure 1:
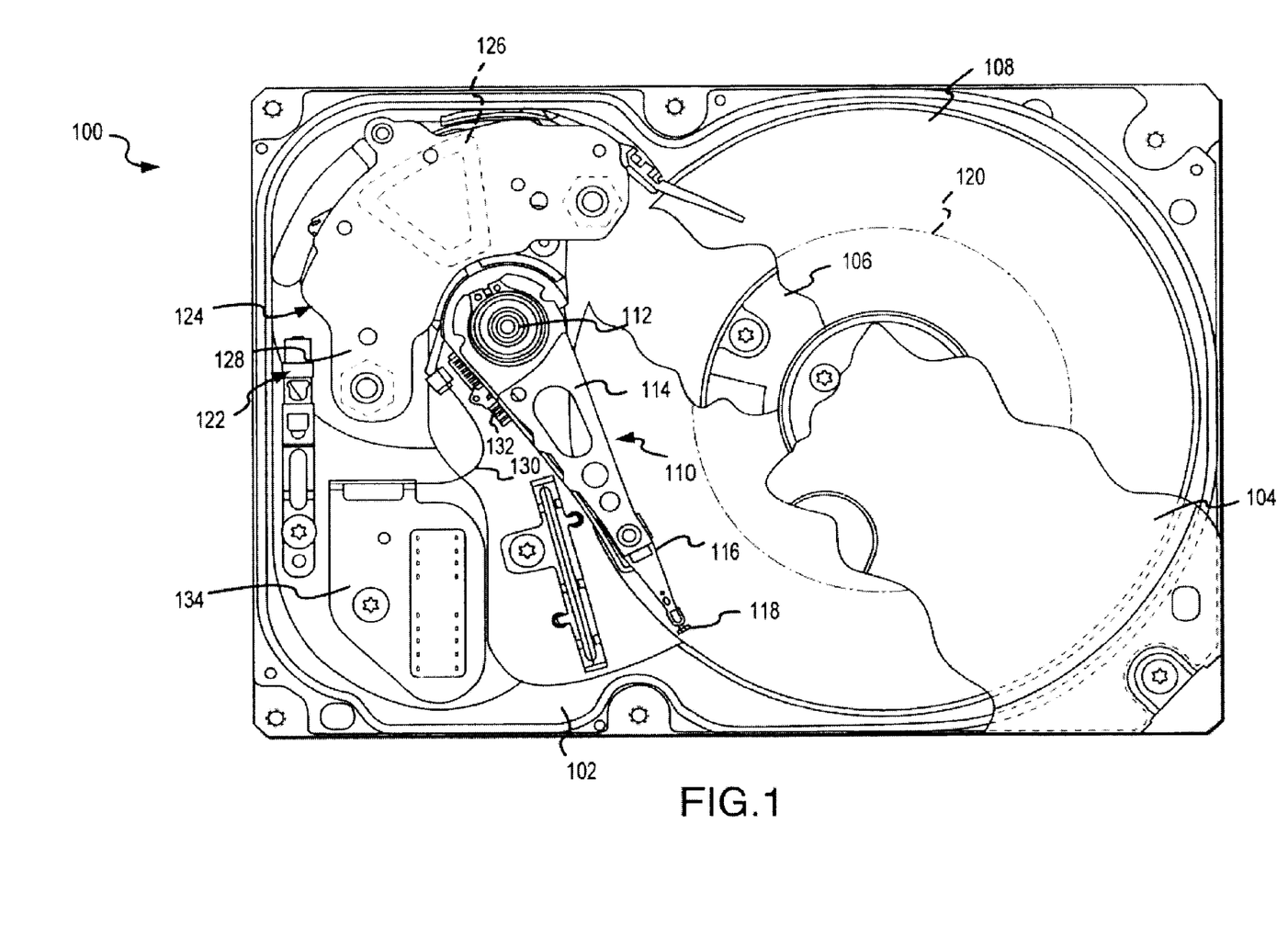
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118, which includes an air, bearing slider enabling the transducer head 118 to fly in close proximity above the corresponding surface of the associated disc 108.

During a seek operation, the track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108.

The spindle motor 106 is typically de-energized when the disc drive 100 is not in use for extended periods of time. The transducer heads 118 are moved over park zones near the inner diameter of the discs 108 when the drive motor is de-energized. The transducer heads 118 are secured over the park zones through the use of an actuator latch arrangement 122, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a preamplifier 132 to which head wires (not shown) are connected; the head wires being routed along the actuator arms 114 and the flexures 116 to the heads 118. The preamplifier 132 amplifies read signals generated by the heads 118 during a read operation. The flex assembly 130 terminates at a flex bracket 134 for communication through the base deck 102 to a disc drive printed circuit board (not shown) mounted to the bottom side of the disc drive 100.

The present invention offers a means of increasing the reliability of data stored in tracks 120 on magnetic media discs 108 at high areal densities. More specifically, the present invention compensates for, or counteracts, the superparamagnetic effect. The superparamagnetic effect is a physical phenomenon encountered when the magnetic bits used to store information on magnetic storage devices become extremely small and thermodynamically unstable.

Due to the physical properties of the disc media 108, the orientation decay rate of a large magnetic bit is exponentially slower than the orientation decay rate of a small magnetic bit. An inverse relationship exists between bit size and bit frequency; as magnetic bit size decreases, magnetic bit frequency increases. It follows that the decay rate of a low frequency magnetic bit on the magnetic media 108 will be exponentially slower than the decay rate of a high frequency magnetic bit on the magnetic media 108. As a result, a high frequency signal (corresponding to the small, high frequency magnetic bit) and a low frequency signal (corresponding to the large, low frequency magnetic bit) can be written on the magnetic media 108 and monitored as representative of the orientation decay of the magnetic bits.

The low frequency reference signal's decay, for all practical purposes, is negligible when compared to the high frequency reference signal's decay due to the exponential difference in decay rates. Consequently, any change in the difference of the magnitude of the parametric information between the two reference signals actually reflects the level of signal degradation that has occurred in the high frequency reference signal.

In accordance with a preferred embodiment of the present invention, the highest frequency reference signal that can be written on the magnetic media 108 represents and corresponds to the highest frequency, smallest magnetic bits that can be stored on the media 108. The smallest data bits that can possibly be stored on the magnetic media 108 decay faster than the other data bits, and therefore, can be considered as the worst-case risk for data loss. Any degradation of the high frequency reference signal (after originally being written) can be used as an indication that the smallest magnetic data bits have decayed. The user knows that the smallest magnetic data bits have decayed and recovery and back-up procedures should be instituted in order to prevent data loss once the high frequency reference signal's decay surpasses a threshold value.

It is obvious that a frequency can be chosen for the "high frequency" reference signal that does not directly correspond to the smallest possible magnetic bit size. A lower, "high frequency" reference signal may be selected, depending on how much time the manufacturer or user wishes to be fore-warned that data has decayed. However, in a preferred embodiment, the "high frequency" is chosen to correspond to the smallest data bit stored on the magnetic media. The preferred embodiment affords the greatest amount of fore-warning of data decay because the frequency that corresponds to the smallest data bit stored on the magnetic media 108 is chosen.

According to the present invention, a high frequency reference signal and a low frequency reference signal are written onto the magnetic media 108 during the manufacturing process and/or during normal operation. The low frequency reference signal corresponds to larger magnetic bits on the storage media surface, whereas the high frequency reference signal corresponds to smallest magnetic bits on the media surface.

Figure 2:
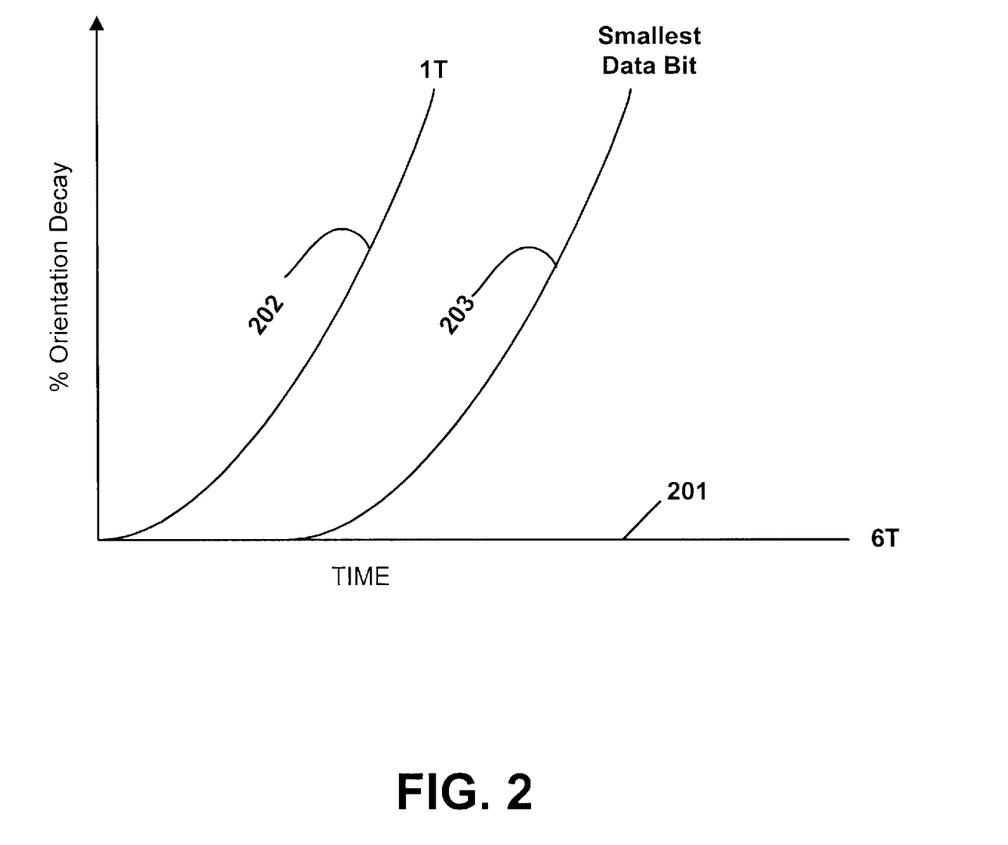
FIG. 2 is a graphical representation of the decay rates of a high frequency reference signal, a low frequency reference signal, and data stored in the smallest sized magnetic domain in accordance with a preferred embodiment of the present invention.

FIG. 2 is a plot of percent bit orientation decay versus time that illustrates the decay rates of a low frequency (6T) reference signal 201 on the horizontal axis, a highest frequency (1T) reference signal 202 that can be written by the particular disc drive system, and the smallest magnetic domain data bit 203 that can be stored on the particular magnetic media 108. It should be noted that the period (designated "T"), equals 1/f, where "f" is the highest frequency that can be written by the particular disc drive system being used. It should further be noted that the low frequency signal should be at least a factor of 2, or 2T, the period of the highest frequency signal. In a preferred embodiment, a 6T signal is used and, as shown in FIG. 2, is drawn coincident with the time axis because the 6T frequency reference signal's decay rate is essentially negligible when compared with the decay rate of the 1T frequency signal. As can be seen in FIG. 2, the high frequency reference signal's decay rate 202 is comparable to the smallest magnetic data bit's decay rate 203 (the curves are offset in time because the high frequency reference signal is usually written on the super track or in the super sector by the manufacturer before the user data is written). Therefore, the high frequency reference signal's decay 202 can be used as an indicator of the amount of decay that has occurred in the smallest magnetic data bit 203. This is important because the smallest magnetic bit 203, due to the superparamagnetic effect, will decay at a faster rate than a larger magnetic bit. The decay of the smallest data bit 203 is, in other words, the worst-case scenario of decay for all magnetic data bits in the entire data storage region on the magnetic media 108.

FIG. 2 also illustrates that the decay rate of the high frequency reference signal 202 is exponentially larger than the decay rate of the low frequency reference signal 201; and therefore, the low frequency reference signal's decay rate 201 can be used as a baseline for determining the change in the high frequency reference signal's 202 (and therefore, the smallest magnetic data bit's 203) decay rate. The difference between the high frequency reference signal's decay rate 202 and the low frequency reference signal's decay rate 201 can be used to determine when data needs to be refreshed.

Figure 3:
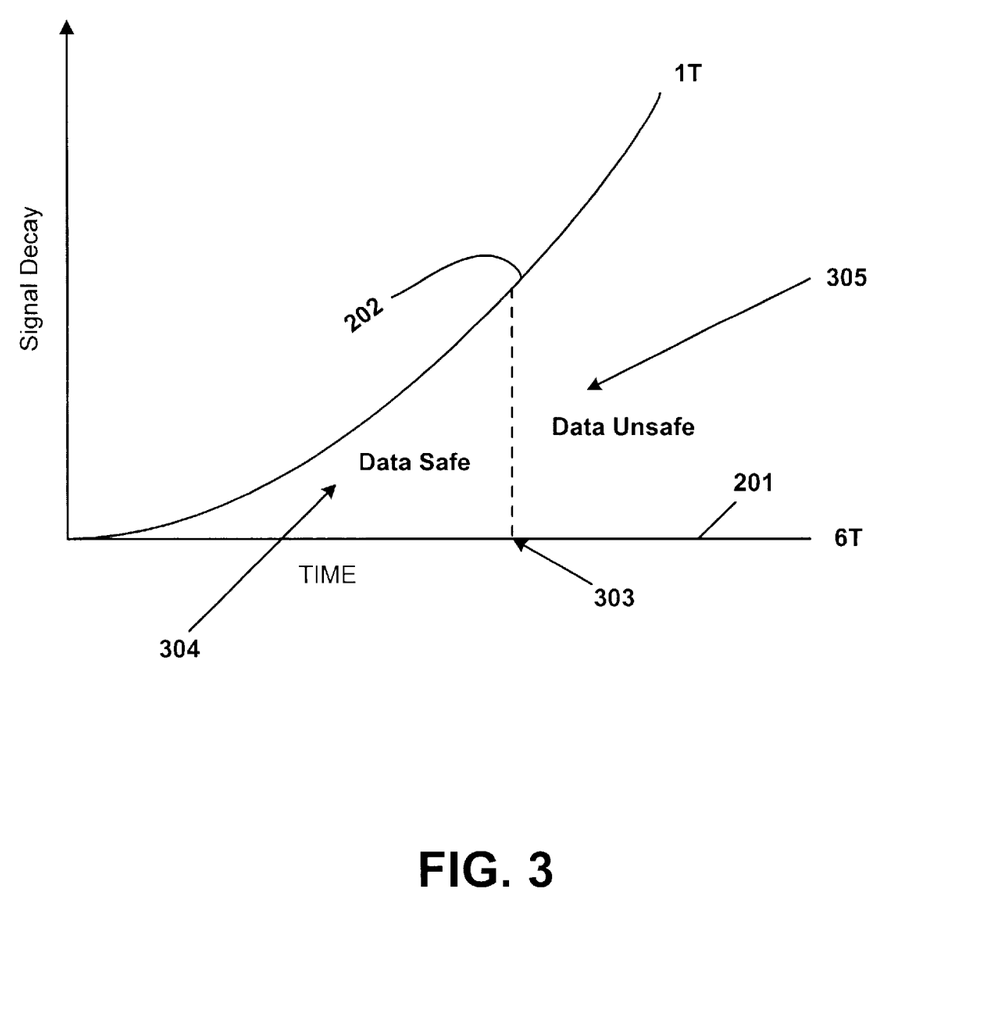
FIG. 3 is a graphical representation showing the difference in the decay rates between a high and low frequency reference signal in relationship to a threshold level.

FIG. 3 is a plot that illustrates signal decay versus time. The area under the curve represents the difference, Δ, between the high frequency reference signal's (1T) decay rate 202 and the low reference signal's (6T) decay rate 201. It should be noted that the low frequency signal should be at least a factor of 2, or 2T, the period of the highest frequency signal. In a preferred embodiment, a 6T signal 201 is used as a baseline because of its slow decay rate as compared to the 1T signal 202. The difference between the decay rates of the 1T signal 202 and 6T signal 201 actually represents the decay of the 1T signal 202 (because the 6T signal 201, for all practical purposes, remains constants over time), and similarly, corresponds to the decay of the smallest magnetic data bit 203 (i.e., worst-case scenario for the whole data region). Area 304 under the curve 202 and to the left of the threshold value 303 in FIG. 3 represents data that is acceptably safe. Any data that falls within Area 304 does not need to be refreshed. Area 305 under the curve 202 and to the right of the threshold value 303 in FIG. 3 represents data that has decayed past an unacceptable amount and should be refreshed.

Figure 4:
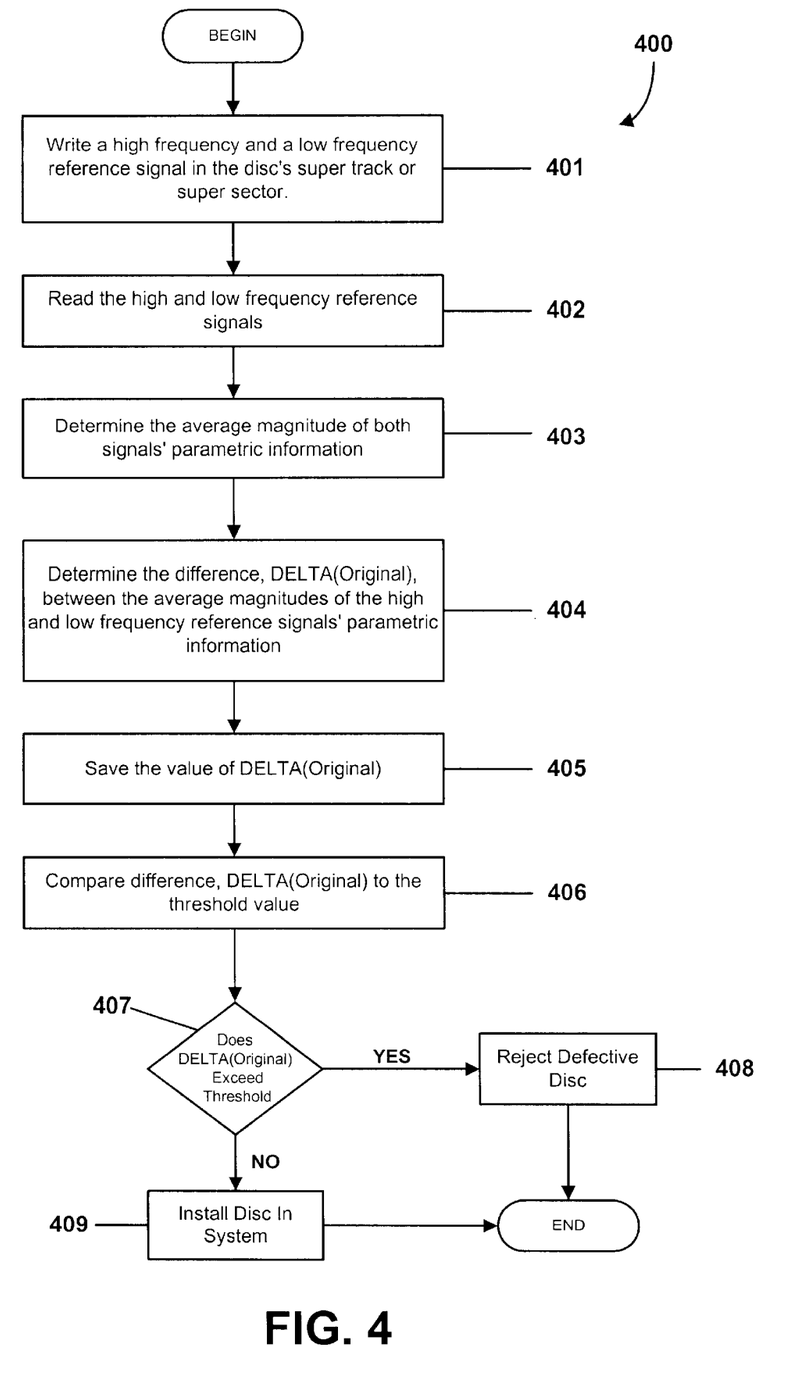
FIG. 4 is a flow chart of the testing method during the manufacturing process in accordance with a preferred embodiment of the present invention.

A disc drive 100 is used here to illustrate a preferred embodiment, although the present invention pertains to other magnetic media storage devices such as tape drives among others. FIG. 4 shows the preferred operational steps of the method 400 in accordance with the invention as implemented during the drive 100 manufacturing process. The high and low frequency reference signals 201, 202 are first written to a system track (in the "super track" 601 or "super sector" 602) on a disc 108 in operation 401. The reference signals 201, 202 can contain important parametric information such as amplitude, bit error rate, signal to noise ratio, and spectrum information (FFT of the signal). Operational control is then passed to operation 402.

In operation 402, the disc drive's read/write head 118 is used to read the reference signals 201, 202 from the system track. It is preferable that operation 402 acquires many samples of the high and low frequency reference signals 201, 202.

Control passes to operation 403 once a sufficient number of samples are acquired by operation 402. Operation 403 determines the average magnitude of the parametric information of each reference signal 201, 202. Operation 403 can be implemented using the channel chip located on the disc drive 100 or by another processor on or off of the disc drive 100. The average magnitude values calculated by operation 403 are then passed to operation 404.

Operation 404 determines the difference ("$\Delta$") between average value of the high frequency reference signal 202 and the average value of the low frequency reference signal 201 passed from operation 403. Operation 404 can be implemented using the channel chip located on the external servo control printed circuit board on disc drive 100 or by another processor on or off of disc drive 100. The difference (i.e., $\Delta$) is a figure of merit between the high and low frequency reference signals 201, 202. In effect, the $\Delta$ is a common mode noise rejection value. This common mode rejection value can then be used to eliminate "noises" (such as media common noise, head electrical noise, head electrical signal imperfections, and preamplifier noise among others) from the readings of both the high and low frequency reference signals. This common mode rejection value can also be used to eliminate environmental factors such as temperature, atmospheric pressure, and humidity among others.

The $\Delta$ value obtained the first time operation 404 is completed after writing the reference signals 201, 202 on the media (designated as "$\Delta_{original}$") is saved in a log as a reference baseline by operation 405. For a disc drive 100, operation 405 stores $\Delta_{original}$ in a log on the disc media 108 (preferably in the disc's super sector 602 or super track 601) or in system memory for future use when disc drive 100 is operated. (Note that other information such as the parametric data and the warning threshold limit value can also be stored with $\Delta_{original}$.) Operational control then transfers to operation 406.

Operation 406 exercises control after $\Delta_{original}$ is stored by operation 405. Operation 406 either prompts the manufacturer/user for a threshold limit input 303, or it retrieves a threshold limit 303 previously stored by the manufacturer/user on the disc media 108, in system memory, or somewhere accessible by the disc drive 100 unit. Operation 406 compares $\Delta_{original}$ to the threshold limit 303 once the values for the threshold limit 303 and $\Delta_{original}$ are obtained.

Comparison of $\Delta_{original}$ to the threshold value 303 leads to determination operation 407. If $\Delta_{original}$ exceeds the threshold value 303, control branches "YES" and disc drive 100 fails. Operation 408 assumes control if disc drive 100 fails. Disc drive 100 is rejected in operation 408. If $\Delta_{original}$ does not exceed the threshold value 303, control branches "NO" and disc drive 100 passes. (Note: the evaluation completed by the present invention can be combined with existing disc drive certification processes as one of many steps for determining whether a disc drive 100 passes or fails.) Operation 409 assumes control if disc drive 100 passes and it is either installed in a computer system or shipped directly to a customer (not shown).

Figure 5:
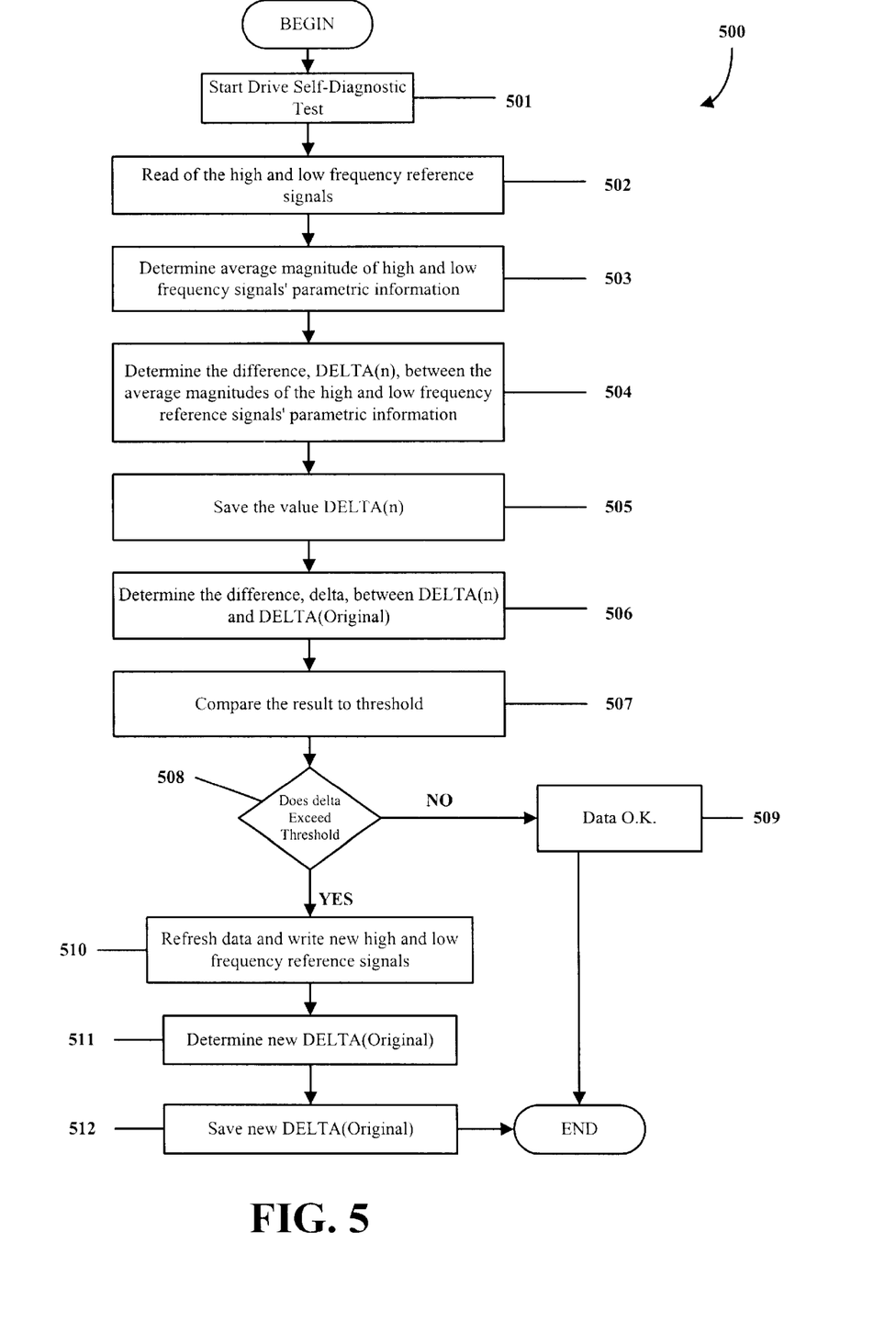
FIG. 5 is a flow chart of the testing method during normal operation of the disc drive in accordance with a preferred embodiment of the present invention.

Again, a disc drive 100 is used to illustrate a preferred embodiment even though the present invention pertains to all magnetic media storage devices such as tape drives among others. FIG. 5 shows the preferred operational process 500 of the invention as implemented during a normal disc drive 100 start-up operation. Process 500 is normally implemented after process 400 has already been applied during the manufacturing process. Process 500 begins when a computer system using a disc drive 100 is turned on or rebooted. The self-diagnostic test of operation 501 can occur each time that the computer system activates the disc drive 100. Operation 501 can be controlled by disc drive system firmware or in the operating system software. Operation 501 may also include any number of other user or manufacturer-specified diagnostic steps to determine whether disc drive 100 is functioning properly or whether some remedial action needs to be undertaken.

Once self-test operation 501 is implemented, operation 502 engages. Operation 502 uses the disc drive read/write head 118 to read the reference signals 201, 202 stored on the disc media 108 during disc drive 100 manufacturing. Operation 502 measures the real time parametric information of the high and low frequency reference signals 201, 202. Note: this is the same parametric information that was measured in operation 402 during the manufacturing process (i.e., the information used to determine $\Delta_{original}$). It is preferable that operation 502 acquires many samples of the high and low frequency reference signals 201, 202. Once a sufficient number of samples are acquired, control passes to operation 503.

Operation 503, determines the average magnitude of the parametric information for both the high frequency and low frequency reference signals 201, 202. Operation 503 can be implemented using the channel chip located on the external servo control printed circuit board on disc drive 100 or by another processor on or off of the disc drive 100. The average values calculated by operation 503 are then passed to operation 504.

Operation 504 determines the difference ("$\Delta_n$", where n is the number of times the self-test has been run) between the average parametric magnitude value of the high frequency reference signal 202 and the average parametric magnitude value of the low frequency reference signal 201 passed from operation 503. Operation 504 can be implemented using the channel chip located on the external servo control printed circuit board on disc drive 100 or by another processor on or off of the disc drive 100. The difference (i.e., $\Delta_n$) is a figure of merit between the parametric magnitudes of the high and low frequency reference signals 201, 202. $\Delta_n$ is, in effect, a common mode noise rejection value. This common mode rejection value can be used to eliminate "noises" (such as media common noise, head electrical noise, head electrical signal imperfections, and preamplifier noise among others) from the readings of both the high and low frequency reference signals 201, 202. This common mode rejection value can also be used to eliminate environmental factors such as temperature, atmospheric pressure, and humidity among others.

Operation 505 takes the value $\Delta_n$, obtained by operation 504, and stores it in a log on the system. For a disc drive 100, Operation 505 stores $\Delta_n$ in a log on the disk media 108 (preferably in the disc's super sector 602 or super track 601) or in system memory (Note that other information such as the parametric data, warning threshold limit value 303, and $\Delta_{original}$ can also be stored with $\Delta_n$). Every value stored can be used for later diagnostic test. A manufacturer, for example, can use the stored information to determine the rate of data failure for a certain model of disc drive, to control trending to optimize the threshold settings 303, and thereafter, to implement steps to improve disc drive performance and yield.

Operation 506 exercises control after $\Delta_n$ is stored by operation 505. Operation 506 accepts $\Delta_n$ from operation 505 and also retrieves the value of $\Delta_{original}$ previously stored on the disc media 108 or in system memory by operation 405. Operation 506 determines the difference ("δ") between $\Delta_n$ and $\Delta_{original}$. The difference, δ, between $\Delta_n$ and $\Delta_{original}$ represents the amount of data decay that has occurred on the disc drive 100 since the high and low frequency reference signals 201, 202 were first written or refreshed. The difference (i.e., δ) can be considered as a figure of merit between $\Delta_{original}$ and $\Delta_n$. δ is, in effect, a common mode noise rejection value for $\Delta_{original}$ and $\Delta_n$.

Operation 507 accepts δ, the value of the difference between $\Delta_n$ and $\Delta_{original}$ as determined in operation 506, and either prompts the user to enter a threshold value, $δ_{threshold}$, or retrieves the threshold value, $δ_{threshold}$, previously stored by the manufacturer on the disc media 108 or in system memory. Operation 507 then compares δ, obtained in operation 506, to the threshold value, $δ_{threshold}$.

Control then passes to determination operation 508. If δ, the difference between $\Delta_n$ and $\Delta_{original}$, does not exceed $δ_{threshold}$, control branches "NO" and operation 509 assumes control. Operation 509 notifies the user that the data is safe and that a backup or refresh procedure need to be implemented. After operation 509, the remaining steps (not shown) of the disc drive 100 self-test are completed and normal disc drive 100 operation begins.

Conversely, if δ, the difference between $\Delta_n$ and $\Delta_{original}$, exceeds $δ_{threshold}$ in determination operation 508, control branches "YES" and operation 510 assumes control. Operation 510 automatically refreshes the high frequency and low frequency reference signals 201, 202 (i.e., writes a new high frequency 202 and a new low frequency 201 reference signal on the disc media 108) and backs-up and/or refreshes (i.e., re-writes) the data on the disc media 108. Operation 510 can alternatively be set to prompt the user that a backup and/or refresh procedure needs to be implemented. Refreshing the high frequency and low frequency reference signals 201, 202 eliminates the signal degradation that has occurred since the time the product was shipped from the manufacturer. In other words, the high frequency and low frequency reference signals 201, 202 are refreshed with the data in order to maintain the close correspondence between the high frequency signal's decay 202 and the orientation decay of the data bits. The link between the high frequency reference signal 202 and the data bit's orientation would be broken and data would either be rewritten too often or not rewritten when the need existed if the high frequency reference signal 202 was not refreshed. Control passes to operation 511 after operation 510 is completed.

Operation 511 determines a new $\Delta_{original}$ value. Operation 511 entails the same steps as completed in steps 402, 403, and 404. In short, operation 511 entails: 1) using the disc drive read/write head 118 to read the new reference signals (preferably acquiring many samples of the high and low frequency reference signals 201, 202); 2) determining the average magnitude of the parametric information for each reference signal 201, 202; and 3) determining the difference ($\Delta_{original}$) between the average magnitude values of the new high frequency reference signal 202 and the new low frequency reference signal 201. A new $\Delta_{original}$ value is determined because the reference signals 201, 202 and data were refreshed in operation 510.

After operation 511 is complete and a new $\Delta_{original}$ had been determined, operation 512 assumes control. Operation 512 saves the new $\Delta_{original}$ to the log on the disc media 108 (preferably in the disc's super sector) or in system memory. The new $\Delta_{original}$ can overwrite the old $\Delta_{original}$, or alternatively, the old $\Delta_{original}$ can be maintained in the log. As previously mentioned, the values stored in the log ($\Delta_n$, $_{n-1}$, ... $\Delta_{original}$, etc.) can be used as a diagnostic tool to determine the health of the disk drive 100, as an indicator of whether the disc drive 100 should be replaced, and as a means to optimize the value for $δ_{threshold}$ among others. Operational process 500 terminates after operation 512 is completed. Alternatively after operation 512 is completed, operational process 500 can be restarted (not shown) to insure that the data was effectively refreshed.

Figure 6A:
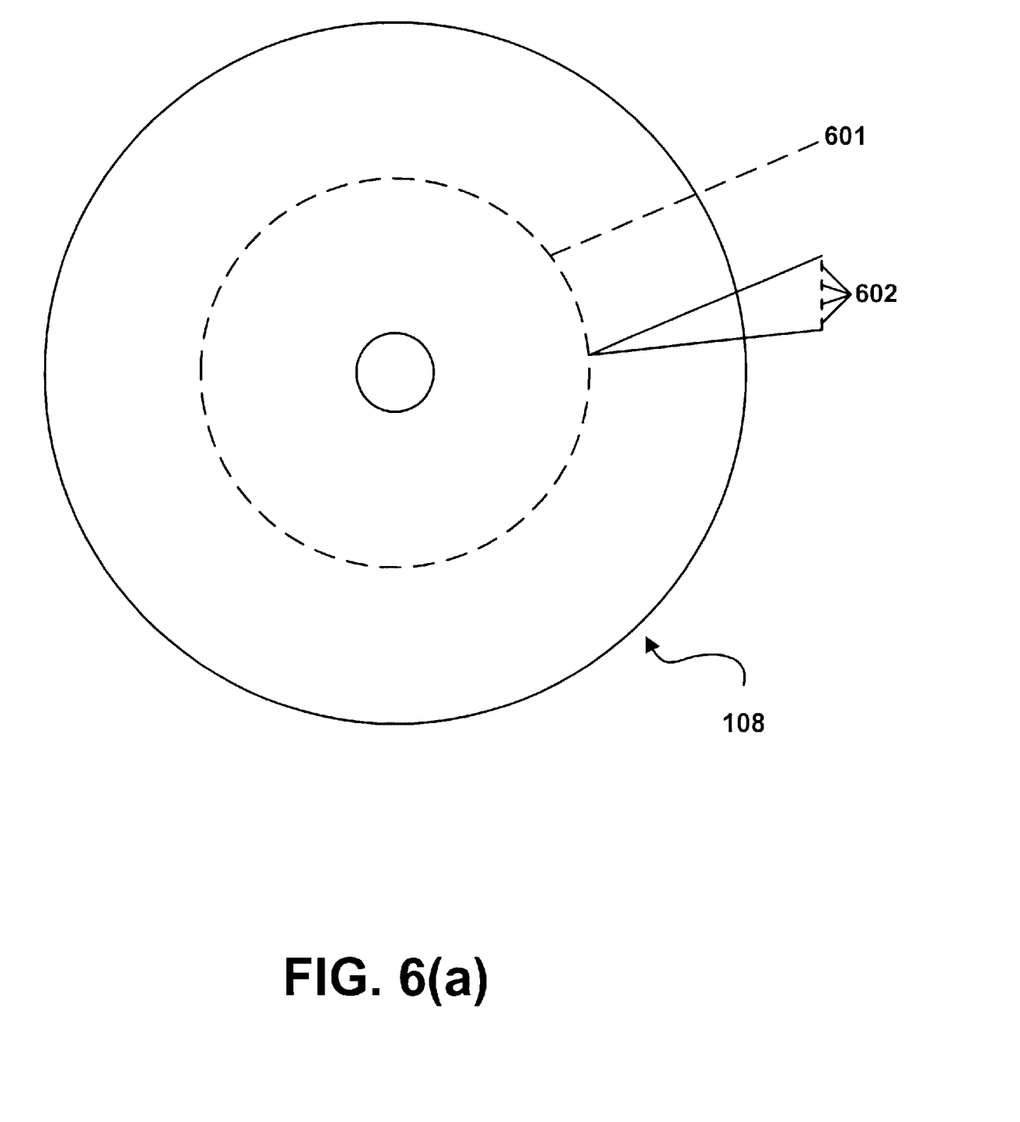
FIGS. 6(a)–(c) illustrate preferred embodiments of the present invention for acquiring a number of sample readings for calculating the average magnitudes of the high and low frequency reference signals' parametric information.

FIG. 6(a) illustrates a preferred embodiment for obtaining multiple readings of the high and low frequency reference signals 201, 202 as completed by operation 402 and operation 502. The reference signals 201, 202 are stored in multiple super sectors 602 located in a dedicated super track 601 on the disc surface (such as disc 108 shown in FIG. 1). A super track 601 is a track 120 on disc 108 that only contains super sectors 602. In this embodiment, one complete disc 108 revolution with the read head 118 reading the super track 601 can obtain a sufficient number of samples for the averaging calculation. Additionally, a partial revolution with the read head 118 reading a predetermined number of super sectors 602 on the super track 601 may also obtain a sufficient number of samples for the averaging calculation. The length of the partial revolution (i.e., the number of super sectors 602 read) can be predetermined to acquire a desired number of samples sufficient for the averaging calculation.

Figure 6B:
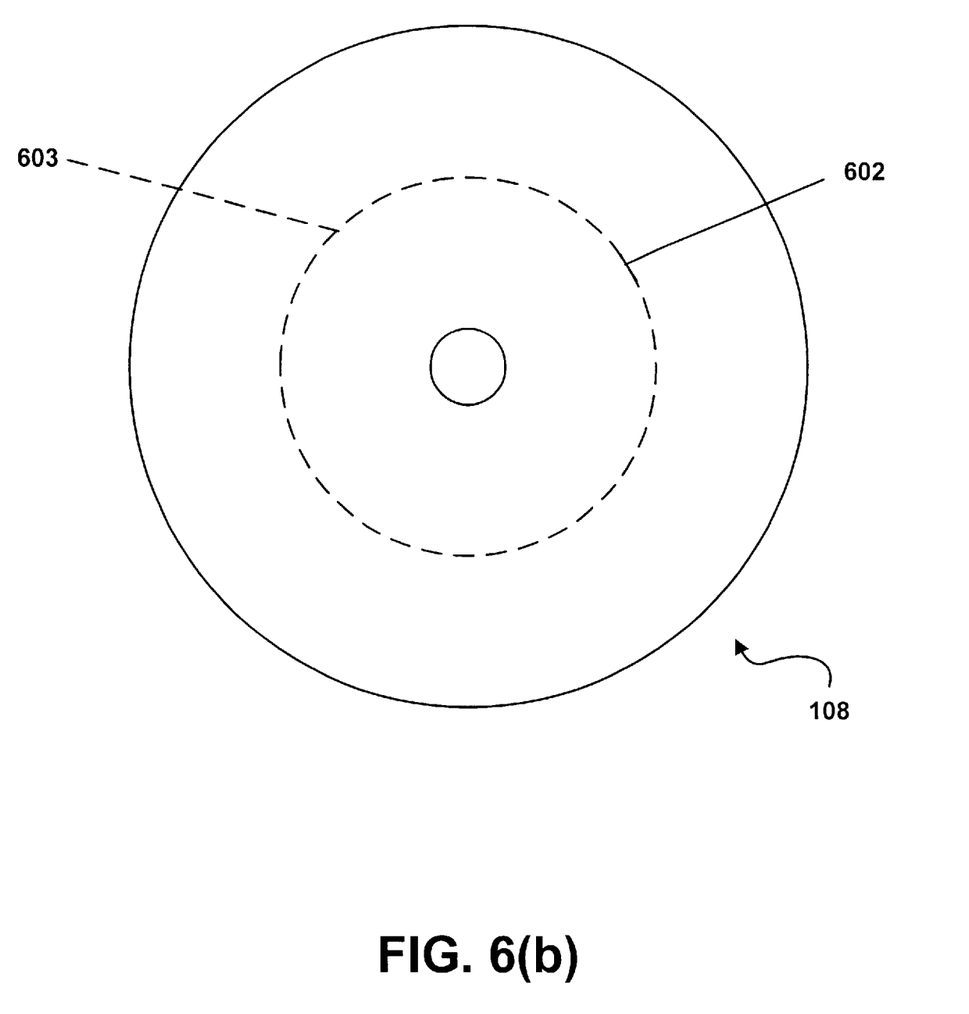

FIG. 6(b) illustrates another embodiment for obtaining multiple readings of the high and low frequency reference signals as completed by operation 402 and operation 502 in which the reference signals are stored in a single super sector 602 located on a system track 603 on the disc surface (such as disc 108 shown in FIG. 1). A system track 603 is a track 120 on disc 108 that contains a super sector 602. A number of revolutions with the read head reading the super sector 602 must be completed to obtain a sufficient number of samples for averaging. The number of revolutions can be predetermined to acquire a desired number of samples sufficient for the averaging calculation.

Figure 6C:
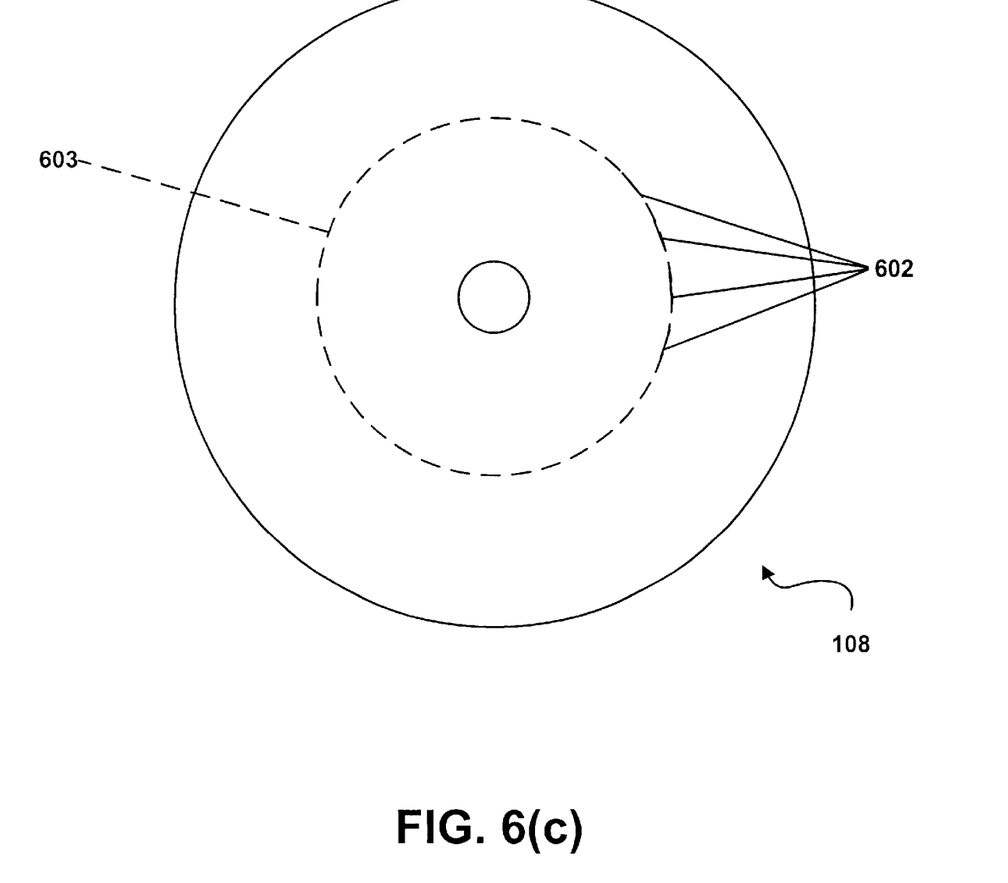

FIG. 6(c) illustrates another embodiment for obtaining multiple readings of the high and low frequency reference signals 201, 202 as completed by operation 402 and operation 502 in which the reference signals 201, 202 are stored in multiple super sectors 602 located on a system track 603 on the disc surface (such as disc 108 shown in FIG. 1). A system track 603 is a track 120 on disc 108 that contains a super sector 602. The number of super sectors 602 located on system track 603 can correspond to the number of samples that are desired to complete the averaging calculation, thereby reducing the amount of time that the read head 118 spends reading the system track 603. Furthermore, the super sectors 602 can be contiguous with one another about system track 603, placed randomly about system track 603 or placed in some pattern around system track 603.

It will be clear that the present invention is well adapted to attain the ends and advantages mentioned as well as those inherent therein. While a presently preferred embodiment has been described above for purposes of this disclosure, various changes and modifications may be made which are well within the scope of the present invention. For example, the super sector 602, or super track 601, containing the high frequency reference signal 202 and the low frequency reference signal 201 are located at the inner diameter of disc 108. In this case when the high frequency reference signal 202 (and consequently the data bit orientation 203) decays past the threshold limit 303, all data on the disc 108 can be refreshed.

The super sector 602, or super track 601, containing the high frequency reference signal 202 and the low frequency reference signal 201 can alternatively be located at the outer diameter of disc 108. In this case, when the high frequency reference signal 202 (and consequently the data domain orientation 203) decays past the threshold limit 303, all data on the disc 108 can be refreshed.

The super sector 602, or super track 601, containing the high frequency reference signal 202 and the low frequency reference signal 201 can also be located at the middle diameter of disc 108. In this case when the high frequency reference signal 202 (and consequently the data domain orientation 203) decays past the threshold limit 303, all the data on the disc 108 can be refreshed.

Multiple super sectors 602, or super tracks 601, can be located in different radial regions of the recording media 108 in order to create "data zones". In this case, each super sector 602, or super track 601, may have the same or different high and low frequency reference signals 201, 202, and may have the same or different threshold values 303, saved within its respective super sector 602 or super track 601. It is preferable, however, to designate different threshold values 303 for each data zone depending on the radial location of the super sector 602 or super track 601. Preferably, the threshold value 303 is increased as the super sector's 602 or super track's 601 radial location approaches the outer diameter ("OD") of disc 108. A higher threshold value 303 compensates for a larger $\Delta$ that occurs as the super sector's 602, or super track's 601, radial location approaches the OD. A larger $\Delta$ results because the disc data rate increases as the disc's 108 OD is approached and because higher mechanical non-repeatable-run-out ("NRRO") occurs as the disc's 108 OD is approached. The measurement of data degradation within each data zone would be monitored using the super sector 602 or super track 601 corresponding to that zone. In this alternative only the data zone with data degradation exceeding that specific zone's threshold value 303 is refreshed. Because only the portion of the disc 108 with "unsafe" data is refreshed, the time needed for backup and refresh procedures is reduced and system resources are conserved. One example is a disc 108 divided into three data zones, each data zone controlled by a separate super sector 602 or super track 601, which has a distinct high frequency reference signal 202, low frequency reference signal 201 and threshold value 303. A separate $\Delta$ ($\Delta_{zone1}$, $\Delta_{zone2}$, and $\Delta_{zone3}$) will be determined for each zone. If $\Delta_{zone3}$ exceeds the threshold 303 for zone three, only data located in zone three will be refreshed.

In yet another embodiment of this invention, each track 120 can contain a high frequency reference signal 202 and a low frequency reference signal 201 so that the data quality can be determined on a track-by-track basis. Only those tracks 120 with data degradation exceeding the threshold value 303 will be refreshed; thereby reducing backup and refresh time and conserving system resources.

In summary, the present invention may be viewed as a method (such as shown in operational flow process 400) of increasing the amount of data that can be reliably stored on a magnetic media (such as 108). The method includes writing a high frequency reference signal (such as 202) and a low frequency reference signal (such as 201) on the magnetic media (such as 108), wherein the high frequency reference signal (such as 202) corresponds to a small magnetic data bit on the magnetic media (such as 108) and the low frequency reference signal (such as 201) corresponds to a large magnetic data bit on the magnetic media (such as 108) (such as shown in FIG. 2). Next the high frequency (such as 202) and the low frequency (such as 201) reference signals are read from the magnetic media (such as 108) and the difference (such as $\Delta$) between the high frequency (such as 202) and the low frequency (such as 201) reference signals is determined. The difference (such as $\Delta$) between the high frequency (such as 202) and the low frequency (such as 201) reference signals is compared to a threshold level (such as 303) and the data stored on the magnetic media (such as 108) is refreshed if the difference (such as $\Delta$) between the high frequency (such as 202) and the low frequency (such as 201) reference signals exceeds the threshold level (such as 303)(such as shown in FIG. 3).

The high frequency reference signal (such as 202) and the low frequency reference signal (such as 201) can include information such as amplitude, bit error rate, signal to noise ratio, and spectrum information. Furthermore, the magnetic media (such as 108) has system tracks (such as 601, 603). Each system track (such as 601, 603) having a super sector (such as 602) located on the system track (such as 601, 603) containing the stored high frequency (such as 202) and the low frequency (such as 201) reference signals (such as shown in FIGS. 6(a)-6(c)).

Additionally, the reading step of the described method can be viewed as taking multiple readings of the high frequency reference signal (such as 202) and of the low frequency reference signal (such as 201) in a predetermined number of super sectors (such as 602). An average value for each of the high frequency reference signals (such as 202) for each of the low frequency reference signals (such as 201) is determined, and the average values are used in the described method to determine the difference (such as $\Delta$) between the high frequency reference signal (such as 202) and the low frequency reference signal (such as 201).

Furthermore, the reading step of the described method can be viewed as taking multiple readings of the high frequency reference signal (such as 202) and of the low frequency reference signal (such as 201) by reading a single super sector (such as 602) a predetermined number of times. $\Delta_n$ average value for each of the high frequency reference signals (such as 202) and each of the low frequency reference signals (such as 201) is determined, and the average values are used in the described method to determine the difference (such as $\Delta$) between the high frequency reference signal (such as 202) and the low frequency reference signal (such as 201).

Finally, the high frequency reference signal (such as 202) in the described method represents the highest frequency that can be written on the magnetic media (such as 108). The highest frequency corresponds to the smallest magnetic data bit (such as 203) that can be written on the magnetic media (such as shown in FIG. 2). Furthermore, the period of the low frequency reference signal (such as 201) is at least two times the period of the high frequency reference signal (such as 202) so that the low frequency reference signal's (such as 201) decay rate appears to be zero when compared to the high frequency reference signal's (such as 202) decay rate (such as shown in FIGS. 2 and 3).

Alternatively, the present invention may be viewed as a method (such as shown in operational flow process 400 and 500) for increasing the amount of data that can be reliably stored on a magnetic media (such as 108), wherein the media has a number of system tracks (such as 601, 603) each system track (such as 601, 603) having a super sector (such as 602). The invention can be implemented by dividing the magnetic media (such as 108) into radial data zones, each data zone having a corresponding system track (such as 601, 603) and a corresponding threshold level (such as 303). A high frequency reference signal (such as 202) (corresponding to a small magnetic data bit) and a low frequency reference signal (such as 201) (corresponding to a large magnetic data bit) (such as shown in FIGS. 2 and 3) can be written to each super sector (such as 602) in each data zone. The high frequency (such as 202) and the low frequency (such as 201) reference signals from each data zone's system track's super sector (such as 602) is read and the difference (such as Δ) between the high frequency (such as 202) and the low frequency (such as 201) reference signals for each data zone is determined. The difference (such as Δ) between the high frequency (such as 202) and the low frequency (such as 201) reference signals for each data zone is compared to the threshold level (such as 303) for each data zone, and the data stored within one of the data zones is refreshed if the difference (such as Δ) between the high frequency (such as 202) and low frequency (such as 201) reference signals for that one data zone exceeds the threshold level (such as 303) for that one data zone.

The high frequency reference signal (such as 202) in a specific data zone can represent the highest frequency that can be written on the magnetic media (such as 108) in that specific data zone. The highest frequency reference signal (such as 202) corresponds to the smallest magnetic data bit (such as 203) that can be written on the magnetic media (such as 108) in that specific data zone (such as shown in FIG. 2). Furthermore, the period of the low frequency reference signal (such as 201) in that specific data zone is at least two times the period of the high frequency reference signal (such as 202) in that specific data zone so that the low frequency reference signal's (such as 201) decay rate appears to be zero when compared to the high frequency reference signal's (such as 202) decay rate (such as shown in FIGS. 2 and 3). The high frequency reference signals (such as 202) and the low frequency reference signals (such as 201) stored in each data zone can include information such as amplitude, bit error rate, signal to noise ratio, and spectrum information.

Additionally, the reading step of the described alternative method can be viewed as taking multiple readings of the high frequency reference signals (such as 202) and of the low frequency reference signals (such as 201) in each data zone by reading a predetermined number of super sectors (such as 602). The average values for the high frequency reference signals (such as 202) and the low frequency reference signals (such as 201) are determined, and the difference (such as Δ) between the high frequency reference signals (such as 202) and the low frequency reference signals (such as 201) for each data zone is determined using the average values.

Furthermore, the reading step of the described alternative method can be viewed as taking multiple readings of the high frequency reference signals (such as 202) and of the low frequency reference signals (such as 201) in each data zone by reading a single super sector (such as 602) in each data zone a predetermined number of times. The average values for the high frequency reference signals (such as 202) and the low frequency reference signals (such as 201) are determined, and the difference (such as Δ) between the high frequency reference signals (such as 202) and the low frequency reference signals (such as 201) for each data zone is determined using the average values.

Finally, the value of the threshold level (such as 303) for the described alternative method can be viewed as changing according to the radial location of the system track (such as 601, 603) containing the super sector (such as 602).

The present invention may also be viewed as a method (such as shown in operational flow process 500) for increasing the amount of data that can be stored on a magnetic media (such as 108). The second alternative method includes writing a high frequency reference signal (such as 202) and a low frequency reference signal (such as 201) on the magnetic media (such as 108), wherein the high frequency reference signal (such as 202) corresponds to a small magnetic data bit on the magnetic media, and the low frequency reference signal (such as 201) corresponds to a large magnetic data bit on the magnetic media (such as shown in FIG. 2). Next, a first high frequency reference signal (such as 202) reading and a first low frequency reference signal (such as 201) reading are taken from the magnetic media (such as 108). The difference (such as $\Delta_{original}$) between the first high frequency reference signal (such as 202) and the first low frequency reference signal (such as 201) readings is determined and a first value corresponding to the difference (such as $\Delta_{original}$) between the first high frequency reference signal (such as 202) reading and the first low frequency reference signal (such as 201) reading is recorded.

A second high frequency reference signal (such as 202) reading and a second low frequency reference signal (such as 201) reading are taken from the magnetic media (such as 108) after the difference (such as $\Delta_{original}$) between the first high and first low frequency reference signals (such as 201 and 202) are recorded. The difference (such as $\Delta_n$) between the second high frequency reference signal (such as 202) reading and the second low frequency reference signal (such as 201) reading is determined and a second value corresponding to the difference (such as $\Delta_n$) between the second high frequency reference signal (such as 202) reading and the second low frequency reference signal (such as 201) reading is recorded. The difference (such as δ) between the first recorded value and the second recorded value is determined. The data on the magnetic media (such as 108) is refreshed if the difference (such as δ) between the first recorded value and the second recorded value exceeds a threshold level (such as 303).

Additionally, the steps of writing, reading, determining the difference (such as $\Delta_{original}$), and storing the difference value pertaining to the first high frequency reference signal (such as 202) and the first low frequency reference signal (such as 201) in the described second alternative method can be viewed as being performed during the data storage device (such as 108) manufacturing process. Furthermore, the difference (such as $\Delta_{original}$) can be compared to a threshold (such as 304) during the data storage device (such as 100) manufacturing process as part of the data storage device (such as 100) certification process.

The first and second high frequency signals (such as 202) and the first and second low frequency signals (such as 201) in the described second alternative method can include amplitude, bit error rate, signal to noise ratio, and spectrum information.

Additionally, the reading steps in the described second alternative method can be viewed as taking multiple readings of the first high frequency reference signal (such as 202), the second high frequency reference signal (such as 202), the first low frequency reference signal (such as 201), and the second low frequency reference signal (such as 201). The average value for each signal is determined, and the difference (such as $\Delta_{original}$) between the first high (such as 202) and low (such as 201) frequency reference signals and the difference (such as $\Delta_n$) between second high (such as 202) and low (such as 201) frequency reference signals is determined using the average values.

Finally, the high frequency reference signal (such as 202) described second alternative method represents the highest frequency that can be written on the magnetic media (such as 108). The highest frequency reference signal (such as 202) corresponds to the smallest magnetic data bit (such as 203) that can be written on the magnetic media (such as 108) (such as shown in FIG. 2). Furthermore, the period of the low frequency reference signal (such as 201) has a period at least two times the period of the high frequency reference signal (such as 202) so that the low frequency reference signal's (such as 201) decay rate appears to be zero when compared to the high frequency reference signal's (such as 202) decay rate (such as shown in FIGS. 2 and 3).

The present invention may further be viewed as an apparatus for increasing the amount of data that can be stored on a magnetic media (such as 108). The apparatus has a high frequency signal generator and a low frequency signal generator. The apparatus has a write element to write the high frequency reference signal (such as 202) and the low frequency reference signal (such as 201) to the magnetic media (such as 108), and a read element to read the high frequency reference signal (such as 202) and the low frequency signal (such as 201) from the magnetic media (such as 108). The apparatus also has an electrical circuit to determine a difference (such as $\Delta$) between the high frequency reference signal (such as 202) and low frequency reference signal (such as 201), an electrical circuit to compare the difference (such as $\Delta$) between the high frequency reference signal (such as 202) and the low frequency reference signal (such as 201) to a threshold value (such as 303), and a controller that activates the write element to refresh the data stored on the magnetic media (such as 108) if the difference (such as $\Delta$) between the high frequency reference signal (such as 202) and low frequency reference signal (such as 201) is greater than the threshold value (such as 303).

Numerous other changes may be made which will readily suggest themselves to those skilled in the art and which are encompassed in the spirit of the invention disclosed and as defined in the appended claims.

What is claimed is:

1. A method for increasing the amount of data that can be reliably stored on a magnetic media comprising steps of:
    (a) writing a high frequency reference signal and a low frequency reference signal on the magnetic media, wherein the high frequency reference signal corresponds to a small magnetic data bit on the magnetic media and the low frequency reference signal corresponds to a large magnetic data bit on the magnetic media;
    (b) reading the high frequency and the low frequency reference signals;
    (c) determining a difference between the high frequency and the low frequency reference signals;
    (d) comparing the difference between the high frequency and the low frequency reference signals to a threshold level; and
    (e) refreshing data stored on the magnetic media if the difference between the high frequency and the low frequency reference signals exceeds the threshold level.

2. The method of claim 1, wherein the high frequency reference signal and the low frequency reference signal in writing step (a) include amplitude, bit error rate, signal to noise ratio, and spectrum information.

3. The method of claim 1, wherein the magnetic media has system tracks, each system track having a super sector located on the system track containing the stored high frequency and the low frequency reference signals.

4. The method of claim 3, wherein the reading step (b) comprises:
    (b)(i) taking multiple readings of the high frequency reference signal and of the low frequency reference signal in a predetermined number of super sectors, the super sectors located on a system track;
    (b)(ii) determining an average value for each of the high frequency reference signals and each of the low frequency reference signals; and,
    (b)(iii) using the average values in determining step (c) to determine the difference between the high frequency reference signal and the low frequency reference signal.

5. The method of claim 3, wherein the reading step (b) comprises:
    (b)(i) taking multiple readings of the high frequency reference signal and of the low frequency reference signal by reading a single super sector a predetermined number of times;
    (b)(ii) determining an average value for each of the high frequency reference signals and each of the low frequency reference signals; and,
    (b)(iii) using the average values in determining step (c) to determine the difference between the high frequency reference signal and the low frequency reference signal.

6. The method of claim 1, wherein the high frequency reference signal represents the highest frequency that can be written on the magnetic media and corresponds to the smallest magnetic data bit that can be written on the magnetic media and the period of the low frequency reference signal is at least two times the period of the high frequency reference signal.

7. A method for increasing the amount of data that can be reliably stored on a magnetic media, wherein the media has a number of system tracks, each system track having a super sector, the method comprising steps of:
    (a) dividing the magnetic media into radial data zones, each data zone having a corresponding system track and a corresponding threshold level;
    (b) writing a high frequency reference signal and a low frequency reference signal to each super sector in each data zone, wherein the high frequency reference signal corresponds to a small magnetic data bit on the magnetic media, and the low frequency reference signal corresponds to a large magnetic data bit on the magnetic media;
    (c) reading the high frequency and the low frequency reference signals from each data zone's system track's super sector;
    (d) determining a difference between the high frequency and the low frequency reference signals for each data zone;
    (e) comparing the difference between the high frequency and the low frequency reference signals for each data zone to the threshold level for each data zone; and
    (f) refreshing the data stored within one of the data zones if the difference between the high frequency and low frequency reference signals for that one data zone exceeds the threshold level for that one data zone.

8. The method of claim 7, wherein the high frequency reference signal in a specific data zone represents the highest frequency that can be written on the magnetic media in that specific data zone and corresponds to the smallest magnetic data bit that can be written on the magnetic media in that specific data zone and the low frequency reference signal has a period at least two times the period of the high frequency reference signal in that specific data zone.

9. The method of claim 7, wherein writing step (b) includes writing amplitude, bit error rate, signal to noise ratio, and spectrum information to each super sector.

10. The method of claim 7, wherein the reading step (c) comprises:

(c)(i) taking multiple readings of the high frequency reference signal and of the low frequency reference signal by reading a predetermined number of super sectors located on a system track;

(c)(ii) determining an average value for the high frequency reference signal and the low frequency reference signal; and, (c)(iii) determining the difference between the high frequency reference signal and the low frequency reference signal using the average values.

11. The method of claim 7, wherein the reading step (c) comprises:

(c)(i) taking multiple readings of the high frequency reference signal and of the low frequency reference signal by reading a single super sector a predetermined number of times;

(c)(ii) determining an average value for the high frequency reference signal and the low frequency reference signal; and, (c)(iii) using the average values to determine the difference between the high frequency reference signal and the low frequency reference signal.

12. The method of claim 7, wherein the value of the threshold level is adjusted for the radial location of the system tack.

13. An apparatus for increasing the amount of data that can reliably be stored on a magnetic media comprising:

a read/write head for writing different frequency signals to and reading different frequency signals from the magnetic media; and means for refreshing the magnetic media's data if a difference in decay rates between the different frequency signals exceeds a threshold value.

14. A method comprising steps of:

determining a difference between a high frequency signal and a low frequency reference signal, wherein the high frequency reference signal corresponds to a small magnetic data bit on the magnetic media and the low frequency reference signal corresponds to a large magnetic data bit on the magnetic media;

comparing the difference between the high frequency and the low frequency reference signals to a threshold level; and optionally refreshing data stored on the magnetic media responsive to whether the difference between the high frequency and the low frequency reference signals exceeds the threshold level.

\* \* \* \* \*